US011816159B2

(12) United States Patent
Volynets et al.

(10) Patent No.: US 11,816,159 B2
(45) Date of Patent: Nov. 14, 2023

(54) METHOD OF AND SYSTEM FOR GENERATING A TRAINING SET FOR A MACHINE LEARNING ALGORITHM (MLA)

(71) Applicant: YANDEX EUROPE AG, Lucerne (CH)

(72) Inventors: Eduard Mechislavovich Volynets, Minsk (BY); Dzianis Sergeevich Pastushyk, Brest (BY)

(73) Assignee: YANDEX EUROPE AG, Lucerne (CH)

( * ) Notice: Subject to any disclaimer, the term of this patent is extended or adjusted under 35 U.S.C. 154(b) by 247 days.

(21) Appl. No.: 17/123,764

(22) Filed: Dec. 16, 2020

(65) Prior Publication Data

US 2021/0374205 A1    Dec. 2, 2021

(30) Foreign Application Priority Data

Jun. 1, 2020    (RU) .................................. 2020117965

(51) Int. Cl.
*G06F 16/901* (2019.01)
*G06F 16/9538* (2019.01)
(Continued)

(52) U.S. Cl.
CPC ...... *G06F 16/9024* (2019.01); *G06F 16/9027* (2019.01); *G06F 16/9538* (2019.01); *G06F 18/214* (2023.01); *G06N 20/00* (2019.01)

(58) Field of Classification Search
CPC .............. G06F 16/438; G06F 16/9538; G06F 16/9024; G06F 16/9027; G06F 18/214; G06K 9/6256; G06N 20/00; G06N 5/02

(Continued)

(56) References Cited

U.S. PATENT DOCUMENTS 8,515,975 B1 *  8/2013  Federici ................ G06F 16/951
                                                                707/750
9,092,483 B2    7/2015  Brockett et al.
(Continued)

FOREIGN PATENT DOCUMENTS

CN       108460396 A     8/2018
CN       104715063 B     11/2018
(Continued)

OTHER PUBLICATIONS

Wang et al., "Improved Retrieval Accuracy for Difficult Queries using Negative Feedback", published in 2007 at the Conference on Information and Knowledge Management (CIKM), 4 pages.

(Continued)

*Primary Examiner* — Phong H Nguyen
(74) *Attorney, Agent, or Firm* — BCF LLP

(57) ABSTRACT

Methods and systems for generating a training set for training a MLA is disclosed. The method comprises: retrieving a plurality of SERPs, generating a graph mapping the plurality of documents and the plurality of queries, such that: a given node of the graph includes a given search query of the plurality of search queries; the given node is connected to a first subset of nodes, each one of the first subset of nodes having a document of the plurality of documents; a specific node of the first subset of nodes being connected to a second subset of nodes; receiving an indication of a search query to generate a negative training example for; identifying a node in the graph associated with the search query; generating the training set including the search query paired with a given document located in another node located by a pre-determined number of nodes away.

20 Claims, 8 Drawing Sheets

(51) Int. Cl.
*G06N 20/00* (2019.01)
*G06F 18/214* (2023.01)

(58) Field of Classification Search
USPC ............ 707/723, 758, 769, 798, 12; 706/12
See application file for complete search history.

(56) References Cited

U.S. PATENT DOCUMENTS

| | | | |
|---|---|---|---|
| 9,104,733 B2 | 8/2015 | Gao et al. | |
| 9,256,680 B2 | 2/2016 | Kumaran | |
| 9,268,824 B1* | 2/2016 | Federici | G06F 16/335 |
| 10,275,406 B2 | 4/2019 | Nikulin | |
| 10,353,974 B2 | 7/2019 | Kuralenok | |
| 10,810,193 B1* | 10/2020 | Subramanya | G06F 16/243 |
| 2009/0193007 A1 | 7/2009 | Mastalli et al. | |
| 2011/0093459 A1 | 4/2011 | Dong et al. | |
| 2012/0150836 A1* | 6/2012 | He | G06F 16/951 |
| | | | 707/E17.084 |
| 2013/0013596 A1* | 1/2013 | Wang | G06F 16/3322 |
| | | | 707/728 |
| 2013/0086024 A1 | 4/2013 | Liu et al. | |
| 2016/0299899 A1* | 10/2016 | Logachev | G06F 16/951 |
| 2017/0220575 A1 | 8/2017 | Hohwald et al. | |
| 2017/0300828 A1* | 10/2017 | Feng | H04L 67/10 |
| 2018/0293242 A1* | 10/2018 | Shishkin | G06F 16/24578 |
| 2019/0332946 A1* | 10/2019 | Han | G06N 5/022 |

FOREIGN PATENT DOCUMENTS

| | | |
|---|---|---|
| CN | 109857845 A | 6/2019 |
| RU | 2580516 C2 | 4/2016 |
| RU | 2677380 C2 | 1/2019 |

OTHER PUBLICATIONS

English Abstract for CN 109857845 retrieved on Espacenet on Dec. 15, 2020.
English Abstract for CN 108460396 retrieved on Espacenet on Dec. 15, 2020.
English Abstract for CN 104715063 retrieved on Espacenet on Dec. 15, 2020.
Russian Search Report dated Jun. 30, 2022 issued in respect of the counterpart Russian Patent Application No. RU 2020117965.

* cited by examiner

METHOD OF AND SYSTEM FOR GENERATING A TRAINING SET FOR A MACHINE LEARNING ALGORITHM (MLA)

CROSS-REFERENCE

The present application claims priority to Russian Patent Application No. 2020117965, entitled "METHOD OF AND SYSTEM FOR GENERATING A TRAINING SET FOR A MACHINE LEARNING ALGORITHM (MLA)", filed on Jun. 1, 2020, the entirety of which is incorporated herein by reference.

FIELD

The present technology relates to machine learning algorithms in general and, more specifically, to a method of and a system for generating a training set for a machine learning algorithm.

BACKGROUND

Machine learning algorithms (MLAs) are used to address multiple needs in computer-implemented technologies. Typically, the MLAs are used for generating a prediction associated with a user interaction with a computer device. One example of an area where such prediction is required is user interaction with the content available on the Internet (as an example).

The volume of available information through various Internet resources has grown exponentially in the past couple of years. Several solutions have been developed in order to allow a typical user to find the information that the user is looking for. One example of such a solution is a search engine. Examples of the search engines include GOOGLE™ search engine, YANDEX™ search engine, YAHOO!™ search engine and the like. The user can access the search engine interface and submit a search query associated with the information that the user is desirous of locating on the Internet. In response to the search query, the search engine provides a ranked list of search results. The ranked list of search results is generated based on various ranking algorithms employed by the particular search engine that is being used by the user performing the search. The overall goal of such ranking algorithms is to present the most relevant search results at the top of the ranked list, while less relevant search results would be positioned on less prominent positions of the ranked list of search results (with the least relevant search results being located towards the bottom of the ranked list of search results).

The search engines typically provide a good search tool for a search query that the user knows apriori that she/he wants to search. In other words, if the user is interested in obtaining information about the most popular destinations in Italy (i.e. a known search topic), the user could submit a search query: "The most popular destinations in Italy?" The search engine will then present a ranked list of Internet resources that are potentially relevant to the search query. The user can then browse the ranked list of search results in order to obtain information she/he is interested in as it related to places to visit in Italy. If the user, for whatever reason, is not satisfied with the uncovered search results, the user can re-run the search, for example, with a more focused search query, such as "The most popular destinations in Italy in the summer?", "The most popular destinations in the South of Italy?", "The most popular destinations for a romantic getaway in Italy?".

When the user submits a search query, the search engine generates a list of relevant web resources (based on an analysis of crawled web resources, an indication of which is stored in a crawler database in a form of posting lists or the like). The search engine then executes the MLA to rank the so-generated list of search results. The MLA ranks the list of search results based on their relevancy to the search query. Such MLA is "trained" to predict relevancy of the given search result to the search query based on a plethora of "features" associated with the given search result, as well as indications of past users' interactions with search results when submitting similar search queries in the past.

In order to use the MLA to predict relevance of search results to a given user-submitted query, the MLA needs to be "trained". Depending on the implementation of the MLA, training can be implemented differently, such as supervised training, unsupervised training, etc. In a typical training approach, though, the MLA is presented with a number of training examples—labelled training sets that are used to "teach" the MLA to draw conclusions on the task at hand (such as predicting relevance of documents to the search query). Typically, the MLA is presented with "positive" examples (in this example, documents that are relevant) and "negative" examples (in this example, documents that are not relevant).

United Stated Patent Publication No. 2017/220575 A1 to Shutterstock Inc. on Jul. 3, 2017, and titled "Identification of Synthetic Examples for Improving Search Ranking" discloses methods, systems and machine-readable media for identifying synthetic media file examples to train a supervised machine learned ranking algorithm to rank relevance of media files to a search query. In one aspect, a method includes identifying a search query for a search engine for a collection of media files from previously received search queries, and selecting at least one training media file from the collection as a synthetic negative example for the search query. The method also includes providing a training set to a supervised machine learned ranking algorithm. The training set includes an identification of the search query, a copy of the training media file, and a first indicator that the training media file is a synthetic negative example for the search query. The method further includes providing, to the algorithm, the search query and the collection, and receiving, from the algorithm, a ranking of the collection.

The article authored by Xuanhui Wang et al., published in 2007 at the Conference on Information and Knowledge Management (CIKM) and titled "Improved Retrieval Accuracy for Difficult Queries using Negative Feedback" considers a situation where the search results are so poor that none of the top-ranked documents is relevant to a user's query, and propose to exploit negative feedback to improve retrieval accuracy for such difficult queries.

SUMMARY

Developers of the present technology have appreciated at least one technical problem associated with the prior art approaches.

The present technology relates to machine learning algorithms in general, and more specifically, to methods and systems for generating a training set for a machine learning algorithm. As has been alluded to above, when training various supervised learning based Machine Learning Algorithms (MLAs)—be it decision tree based MLA, or Neural Networks (NN)—the MLA is fed with "training sets". Training sets are marked examples illustrating both positive examples and negative examples. The positive examples teach the MLA what a particular target "is" and the negative examples teach the MLA what the particular target "is not".

Generally speaking, the positive examples are easy to generate. For example, for search queries and documents pairs, the examples can be "mined" using query logs of a search engine server, with users clicks (or another indication of the user interaction) being a good indication of relevancy of the given past document to the given past user query. The negative examples may be more difficult to generate.

A typical MLA training system uses "random" negative examples with a "hope" that the most random examples will be radically different form the positive examples and, thus, will serve well as negative examples. However, in reality, the "effectiveness" of negative examples is not 100% (closer to a 80% mark).

In accordance with a first broad aspect of the present technology, there is disclosed a computer-implemented method for generating a training set for training a machine learning algorithm (MLA) implemented in an information retrieval system, the MLA executable by a server, the method executable by the server, the method comprising: retrieving, from a search log database of the server, a plurality of search engine result pages (SERPs), a given one of the plurality of SERPs having been generated in response to a respective search query of a plurality of search queries and including a plurality of documents responsive to the respective search query: generating, by a server, a graph mapping the plurality of documents of the plurality of SERPs and the plurality of queries, such that: a given node of the graph includes a given search query of the plurality of search queries; the given node is connected to a first subset of nodes, each one of the first subset of nodes having a document of the plurality of documents, the document having been associated with the given search query; a specific node of the first subset of nodes being connected to a second subset of nodes, each one of the second subset of nodes having search queries that have been associated with the document of the specific node; receiving an indication of a search query to generate a negative training example for training the MLA; identifying a node in the graph associated with the search query; generating the training set to be used as the negative training example for search query for training the MLA, the training set including the search query paired with a given document located in another node located by a pre-determined number of nodes away from the node.

In some non-limiting embodiments of the method, the pre-determined number of nodes is an odd number of nodes.

In some non-limiting embodiments of the method, the pre-determined number of nodes is an odd number of nodes.

In some non-limiting embodiments of the method, an association between the document and the given search query is by virtue of one of being included in an associated SERP and being clicked in response to the associated SERP having been presented.

In some non-limiting embodiments of the method, the another node is included in a third subset of nodes located by the pre-determined number of nodes away from the node, the method further comprises selecting the another node from the third subset of nodes In some non-limiting embodiments of the method, selecting the another node from the third subset of nodes comprises selecting the another node in response to the another node having a highest user interaction parameter being indicative of one or more type of interaction executed by one or more users amongst the third subset of nodes.

In some non-limiting embodiments of the method, the user interaction parameter for the given document being indicative of at least one of: a hovering time for the given document; a click event for the given document In some non-limiting embodiments of the method, the graph is a data tree.

In some non-limiting embodiments of the method, identifying the node in the graph associated with the search query comprises identifying the root node.

In some non-limiting embodiments of the method, the graph is a web-like graph.

In accordance with another broad aspect of the present technology, there is disclosed a computer-implemented method for generating a training set for training a machine learning algorithm (MLA) implemented in an information retrieval system, the MLA executable by a server, the method executable by the server, the method comprising: retrieving, from a search log database: a first search engine result page (SERP) associated with a first query; and a second SERP associated with a second query; the first SERP comprising a given search result at a first position, the second SERP comprising the given search result in a second position; identifying, in the first SERP, a most interacted search result; in response to the product of the first position and the second position being above a predetermined threshold, generating the training set to be used as negative training examples for training the MLA, the training set including the second query paired with the most interacted search result.

In some non-limiting embodiments of the method, the method further comprises generating a second training set to be used as a positive example, the training set including the first query and the most interacted search result.

In some non-limiting embodiments of the method, the most interacted search result comprises a given search result of the first SERP that was clicked.

In some non-limiting embodiments of the method, the given search result is one of a plurality of interacted search results and the wherein the most interacted search result is one of the plurality of interacted search results with a longest interaction.

In some non-limiting embodiments of the method, the predetermined threshold is fifty.

In accordance with another broad aspect of the present technology, there is disclosed a system for generating a training set for training a machine learning algorithm (MLA) implemented in an information retrieval system, the MLA executable by a server, the server comprising a processor configured to: retrieve, from a search log database of the server, a plurality of search engine result pages (SERPs), a given one of the plurality of SERPs having been generated in response to a respective search query of a plurality of search queries and including a plurality of documents responsive to the respective search query: generate, a graph mapping the plurality of documents of the plurality of SERPs and the plurality of queries, such that: a given node of the graph includes a given search query of the plurality of search queries; the given node is connected to a first subset of nodes, each one of the first subset of nodes having a document of the plurality of documents, the document having been associated with the given search query; a specific node of the first subset of nodes being connected to a second subset of nodes, each one of the second subset of nodes having search queries that have been associated with the document of the specific node; receive an indication of a search query to generate a negative training example for training the MLA; identify a node in the graph associated with the search query; generate the training set to be used as the negative training example for search query for training the MLA, the training set including the search query paired with a given document located in another node located by a pre-determined number of nodes away from the node.

In some non-limiting embodiments of the system, the pre-determined number of nodes is an odd number of nodes.

In accordance with another broad aspect of the present technology, there is disclosed a system for generating a training set for training a machine learning algorithm (MLA) implemented in an information retrieval system, the MLA executable by a server, the server comprising a processor configured to: retrieve, from a search log database: a first search engine result page (SERP) associated with a first query; and a second SERP associated with a second query; the first SERP comprising a given search result at a first position, the second SERP comprising the given search result in a second position; identify, in the first SERP, a most interacted search result; in response to the product of the first position and the second position being above a predetermined threshold, generate the training set to be used as negative training examples for training the MLA, the training set including the second query paired with the most interacted search result.

In some non-limiting embodiments of the system, the processor is further configured to generate a second training set to be used as a positive example, the training set including e first query and the most interacted search result.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, and the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other locations where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
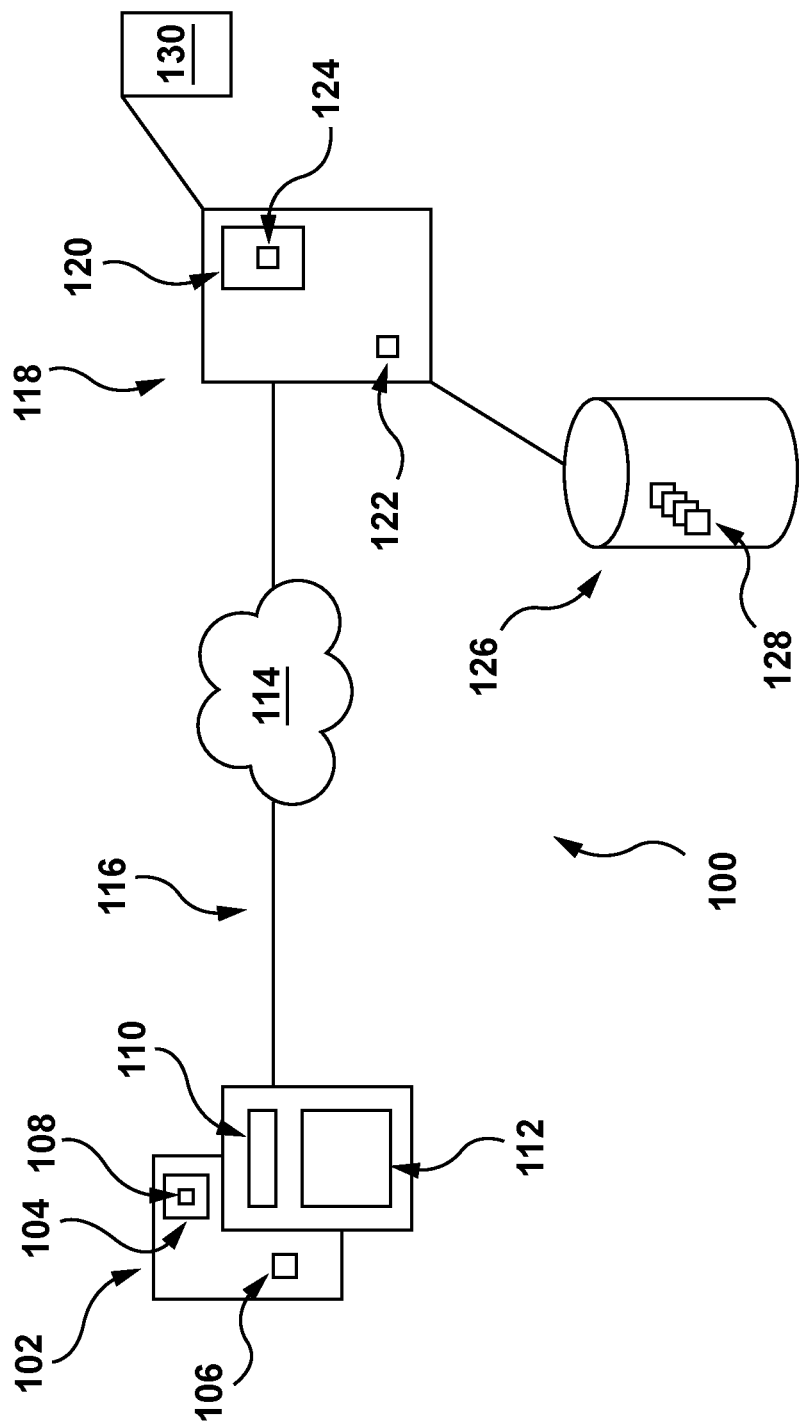
FIG. 1 depicts a diagram of a system implemented in accordance with non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labelled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application-specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

With reference to FIG. 1, the system 100 is an information retrieval system and comprises an electronic device 102. The electronic device 102 is typically associated with a user (not depicted) and, as such, can sometimes be referred to as a "client device".

In the context of the present specification, unless provided expressly otherwise, "electronic device" is any computer hardware that is capable of running a software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "an electronic device" does not preclude multiple client devices being used in receiving/sending, carrying out or causing to be carried out any task or request, or the consequences of any task or request, or steps of any method described herein.

The electronic device 102 comprises a permanent storage 104. The permanent storage 104 may encompass one or more storage media and generally provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards.

The electronic device 102 comprises hardware and/or software and/or firmware (or a combination thereof), as is known in the art, to execute a search engine application 108. Generally speaking, the purpose of the search engine application 108 is to enable the user (not shown) to execute a search, such as a web search using a search engine service hosted on a server (described below). To that end, the search engine application 108 comprises a search query interface 110 and a search results interface 112.

How the search engine application 108 is implemented is not particularly limited. One example of the search engine application 108 may be embodied in the user (not shown) accessing a web site associated with a search engine to access the search engine application 108. For example, the search engine application 108 can be accessed by typing in a uniform resource locator (URL) associated with Yandex™ search engine at www.yandex.ru. It should be expressly understood that the search engine application 108 can be accessed using any other commercially available or proprietary search engine.

In alternative non-limiting embodiments of the present technology, the search engine application 108 may be implemented as a browser application on a portable device (such as a wireless communication device). For example, where the electronic device 102 is implemented as a portable device, such as for example, Samsung™ Galaxy™ S10, the electronic device 102 may be executing a Yandex™ browser application. It should be expressly understood that any other commercially available or proprietary browser application can be used for implementing non-limiting embodiments of the present technology.

Generally speaking, the electronic device 102 comprises a user input interface (not shown) (such as a keyboard) for receiving user inputs into, for example, the query interface 110. How the user input interface is implemented is not particularly limited and will depend on how the electronic device 102 is implemented. Merely as an example and not as a limitation, in those embodiments of the present technology where the electronic device 102 is implemented as a wireless communication device (such as an iPhone™ smart phone), the user input interface can be implemented as a soft keyboard (also called an on-screen keyboard or software keyboard). On the other hand, where the electronic device 102 is implemented as a personal computer, the user input interface can be implemented as a hard keyboard.

Although only a single electronic device 102 is shown, it should be understood that this is merely for ease of illustration and that the system 100 may include more than one electronic device.

The electronic device 102 is coupled to a communication network 114 via a communication link 116. In some non-limiting embodiments of the present technology, the communication network 114 can be implemented as the Internet. In other embodiments of the present technology, the communication network 114 can be implemented differently, such as any wide-area communications network, local-area communications network, a private communications network and the like.

How the communication link 116 is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as the Wireless Fidelity, or WiFi® for short, Bluetooth® or the like) or wired (such as an Ethernet based connection).

It should be expressly understood that implementations for the electronic device 102, the communication link 116 and the communication network 114 are provided for illustration purposes only. As such, those skilled in the art will easily appreciate other specific implementational details for the electronic device 102, the communication link 116 and the communication network 114. As such, by no means, examples provided hereinabove are meant to limit the scope of the present technology.

The system 100 further includes a server 118 coupled to the communication network 114. The server 118 can be implemented as a conventional computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The implementation of the server 118 is well known. However, briefly speaking, the server 118 comprises a communication interface (not depicted) structured and configured to communicate with various entities (such as the electronic device 102 and other devices potentially coupled to the communication network 114) via the communication network 114.

The server 118 comprises a server memory 120 having one or more storage media which generally provides a place to store computer-executable program instructions executable by a server processor 122. By way of example, the server memory 120 may be implemented as tangible computer-readable storage medium including Read-Only Memory (ROM) and/or Random-Access Memory (RAM). The server memory 120 may also include one or more fixed storage devices in the form of, by way of example, hard disk drives (HDDs), solid-state drives (SSDs), and flash-memory cards.

In some non-limiting embodiments of the present technology, the server 118 can be operated by the same entity that has provided the afore-described search engine application 108. For example, the server 118 can be operated by Yandex LLC of Lev Tolstoy Street, No. 16, Moscow, 119021, Russia. In alternative embodiments, the server 118 can be operated by an entity different from the one providing the aforementioned search engine application 108.

In some embodiments of the present technology, the server 118 provides a search engine service 124 (such as Yandex Search™) which is accessible by the search engine application 108 via the communication network 114. The manner in which the search engine service 124 is implemented is known in the art and therefore will not be described in detail herein. Suffice to say that the search engine service 124 is configured to execute one or more web searches responsive to a "search string" entered by the user (not shown) into the query interface 110. The search engine service 124 is further configured to transmit to the electronic device 102 a set of search results, to be displayed to the user of the electronic device 102 via the search results interface 112, as a search engine result page (SERP).

The server 118 is configured to generate a ranked search results list, including the results from the general web search and the vertical web search. Multiple algorithms for ranking the search results are known and can be implemented by the server 118.

Just as an example and not as a limitation, some of the known techniques for ranking search results by relevancy to the user-submitted search query are based on some or all of: (i) how popular a given search query or a response thereto is in searches; (ii) how many results have been returned; (iii) whether the search query contains any determinative terms (such as "images", "movies", "weather" or the like), (iv) how often a particular search query is typically used with determinative terms by other users; and (v) how often other users performing a similar search have selected a particular resource or a particular vertical search results when results were presented using the SERP. The server 118 can thus calculate and assign a relevance score (based on the different criteria listed above) to each search result obtained in response to a user-submitted search query and generate a SERP, where search results are ranked according to their respective relevance scores. In the present embodiment, the server 118 may execute a plurality of machine learning algorithms for ranking documents and/or generate features for ranking documents.

In some non-limiting embodiments of the present technology, the server 118 is communicatively coupled with a log database 126 via a dedicated link (not numbered). Generally, the log database 126 may maintain a plurality of query logs 128.

The purpose of the query logs 128 is to log searches that were made using the server 118. More specifically, the query logs 128 maintain terms of search queries (i.e. the associated search words) and the associated search results. For example, each of the query log included within the plurality of query logs 128 is associated with a respective electronic device (such as the electronic device 102). It is noted that the query logs 128 can be maintained in an anonymized manner—i.e. search queries are not trackable to the users who have submitted the search query.

More specifically, the query logs 128 may include a list of queries with their respective terms, with information about documents that were listed by the server 118 in response to a respective query, a timestamp, and may also contain a list of users identified by anonymous IDs and the respective documents they have clicked on after submitting a query. In some embodiments, the query logs 128 may be updated every time a new search is performed on the server 118. In other embodiments, the query logs 128 may be updated at predetermined times. In some non-limiting embodiments, there may be a plurality of copies of the query logs 128, each corresponding to the query logs 128 at different points in time.

Figure 2:
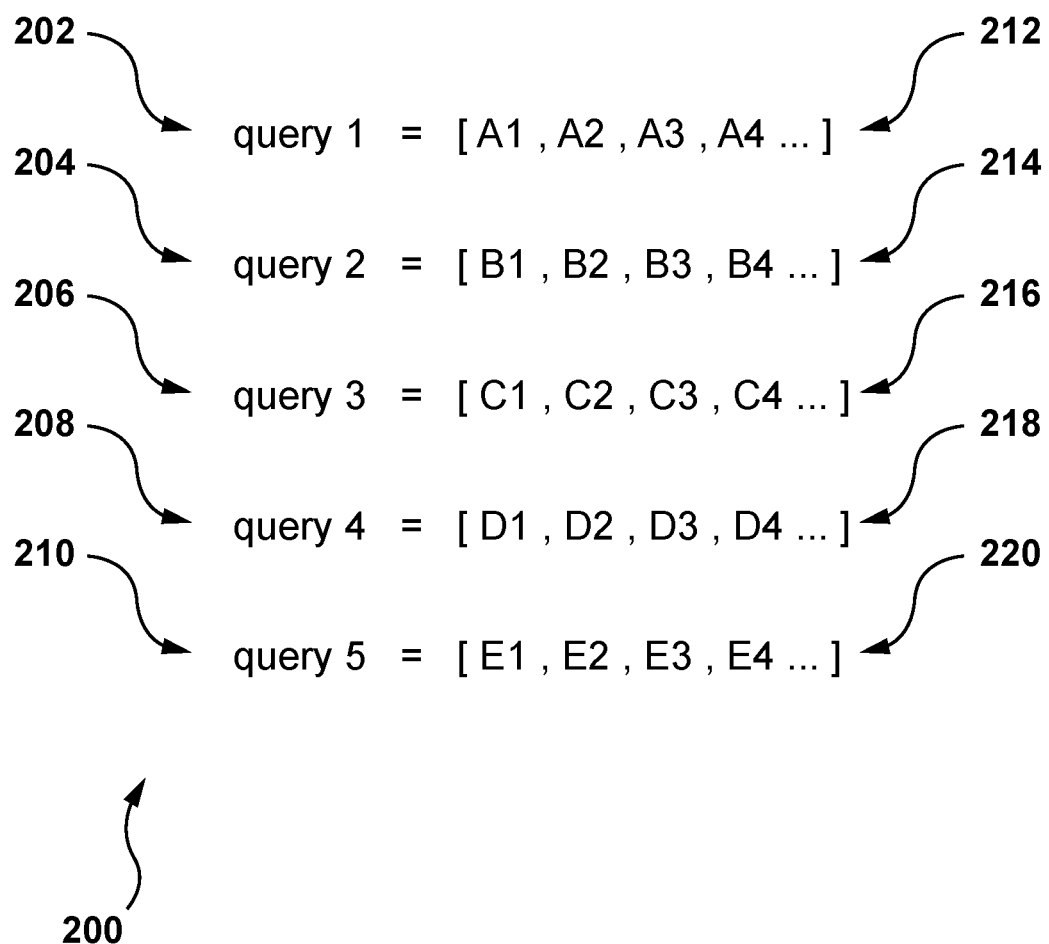
FIG. 2 depicts a schematic illustration of a query log.

With reference to FIG. 2, there is depicted a schematic illustration of a portion 200 of the query logs 128.

In the illustrated example, the portion 200 shows 5 search queries previously submitted (namely a first search query 202, a second search query 204, a third search query 206, a fourth search query 208 and a fifth search query 210). Each of the 5 queries is associated with a respective SERP (namely, a first SERP 212, a second SERP 214, a third SERP 216, a fourth SERP 218 and a fifth SERP 220).

In some non-limiting embodiments of the present technology, the 5 search queries are received from the electronic device 102. Alternatively, the 5 search queries may be received from one or more electronic devices.

Each of the 5 SERPs comprises a plurality of search results. Although in the illustrated embodiment, each of the search result is illustrated as a combination of a letter and a number ("A1" for example), this is done merely for ease of illustration and it should be understood that each search result corresponds to a webpage.

Now, it should be understood that even though different search queries are executed, the generated SERPs may comprise a common search result. For example, the search result A1 (of the first search query 202) may be the same as the search result B4 from the second search query 204, even though the first search query 202 and the second search query 204 are different.

In some non-limiting embodiments of the present technology, the query logs 128 further include user interaction parameters indicative of the interaction, such as clicking of one or more documents in the SERP.

Non-limiting examples of user interaction parameters stored by the query logs 128 include (but are not limited to):
- Loss/Win: was the search result clicked in response to the search query or not (click event).
- Dwell time: time a user spends on a search result before returning to the SERP or abandoning the search (due the fact that the user has found the information she is looking for, as an example).
- Hovering time: time a user hovers on a search result.
- Long/short click: was the user interaction with the search result long or short, compared to the user interaction with other documents on the SERP.

Naturally, the above list is non-exhaustive and may include other types of user interactions without departing from the scope of the present technology.

Returning to FIG. 1, also coupled to the server 118 via a dedicated link is a training server 130. The training server 130 can be implemented as a conventional computer server. In an example of an embodiment of the present technology, the training server 130 can be implemented as a Dell™ PowerEdge™ Server running the Microsoft™ Windows Server™ operating system. Needless to say, the training server 130 can be implemented in any other suitable hardware and/or software and/or firmware or a combination thereof. In the depicted non-limiting embodiment of present technology, the training server 130 is a single server. In alternative non-limiting embodiments of the present technology, the functionality of the training server 130 may be distributed and may be implemented via multiple servers. In the context of the present technology, the training server 130 may implement in part the methods and systems described herein. In some embodiments of the present technology, the training server 130 is under control and/or management of a search engine operator. Alternatively, the training server 130 can be under control and/or management of another service provider. Although the training server 130 is illustrated as a different server than the server 118, it is contemplated that the functionality of the training server 130 described below be executed by the server 118.

Generally speaking, the purpose of the training server 130 is to train one or more machine learning algorithms (MLAs) used by the search engine application 108 by generating a training set.

The training server 130 may, as an example, train one or more MLAs associated with the server 118 for improving general web searches, vertical web searches, providing recommendations, predicting outcomes, and other applications. The training and improvement of the MLAs may be executed at predetermined periods of time, or when deemed necessary by the search engine provider.

Training the MLA

Figure 3:
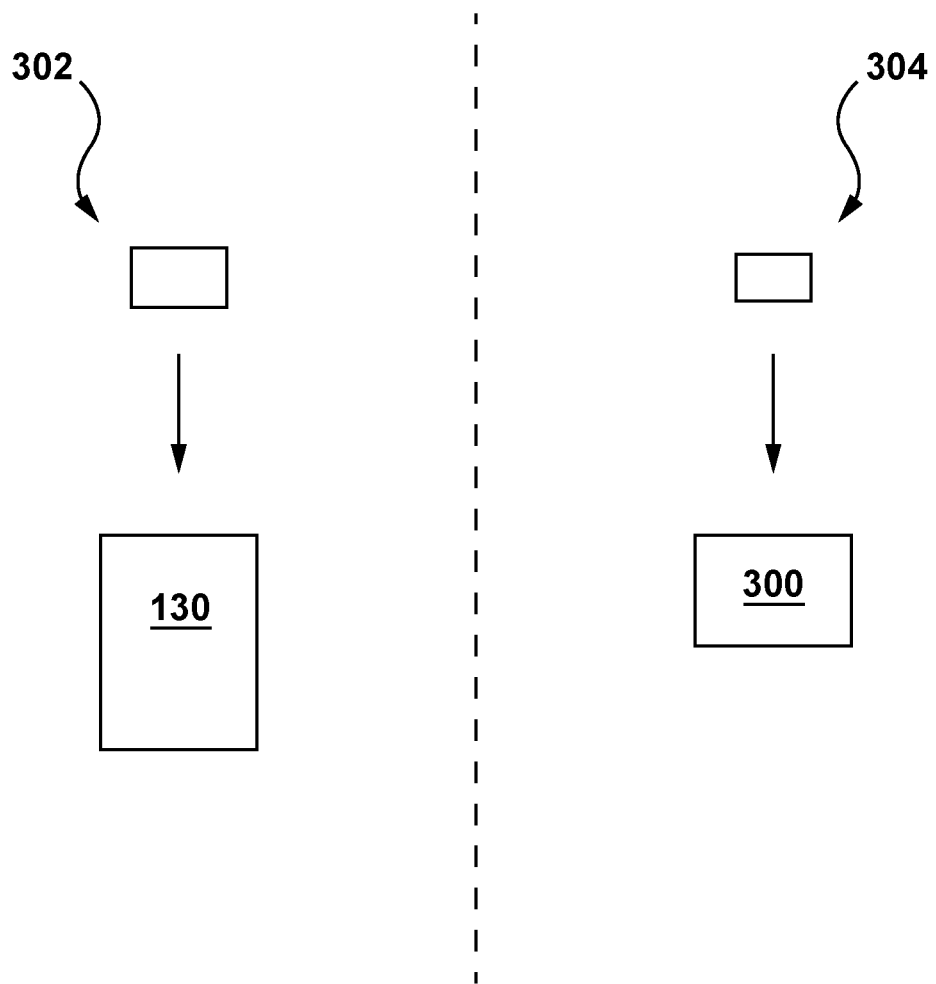
FIG. 3 depicts an example of a process for training a machine learning algorithm used by the system of FIG. 1.

With reference to FIG. 3, a schematic illustration of a process of training a MLA 300 is depicted. The MLA 300 is used by the search engine service 124.

For a better understanding of the underlying concepts of the present technology, it should be understood that the training of the MLA 300 can be broadly separated into a first phase and a second phase. In the first phase, a training input data 304 (discussed below) is generated. In the second phase, the MLA 300 is trained using the training input data 304. Moreover, although the steps of training the MLA 300 are explained as being executed by the training server 130, it is contemplated that the training of the MLA 300 is executed by another entity, such as the server 118.

The generating of the training input data 304 will be explained with reference to two non-limiting embodiments.

First Embodiment

In accordance with a first non-limiting embodiment of the present technology, generating the training input data 304 begins with the training server 130 retrieving a data packet 302 from the log database 126. The data packet 302 comprises the plurality of query logs 128. In some non-limiting embodiment of the present technology, the training server 130 is configured to retrieve the query logs 128 periodically, such as every day, week, and the like. In another non-limiting embodiment of the present technology, the training server 130 is configured to retrieve the one or more query logs 128 that meet a predetermined criterion, such as for example, the query logs that include searches made within the past hour, past day, and the like.

In response to receiving the query logs 128, the training server 130 is configured to analyze the plurality of query logs 128 to identify one or more search results presented in response to two or more search queries (described in more detail below).

Figure 6:
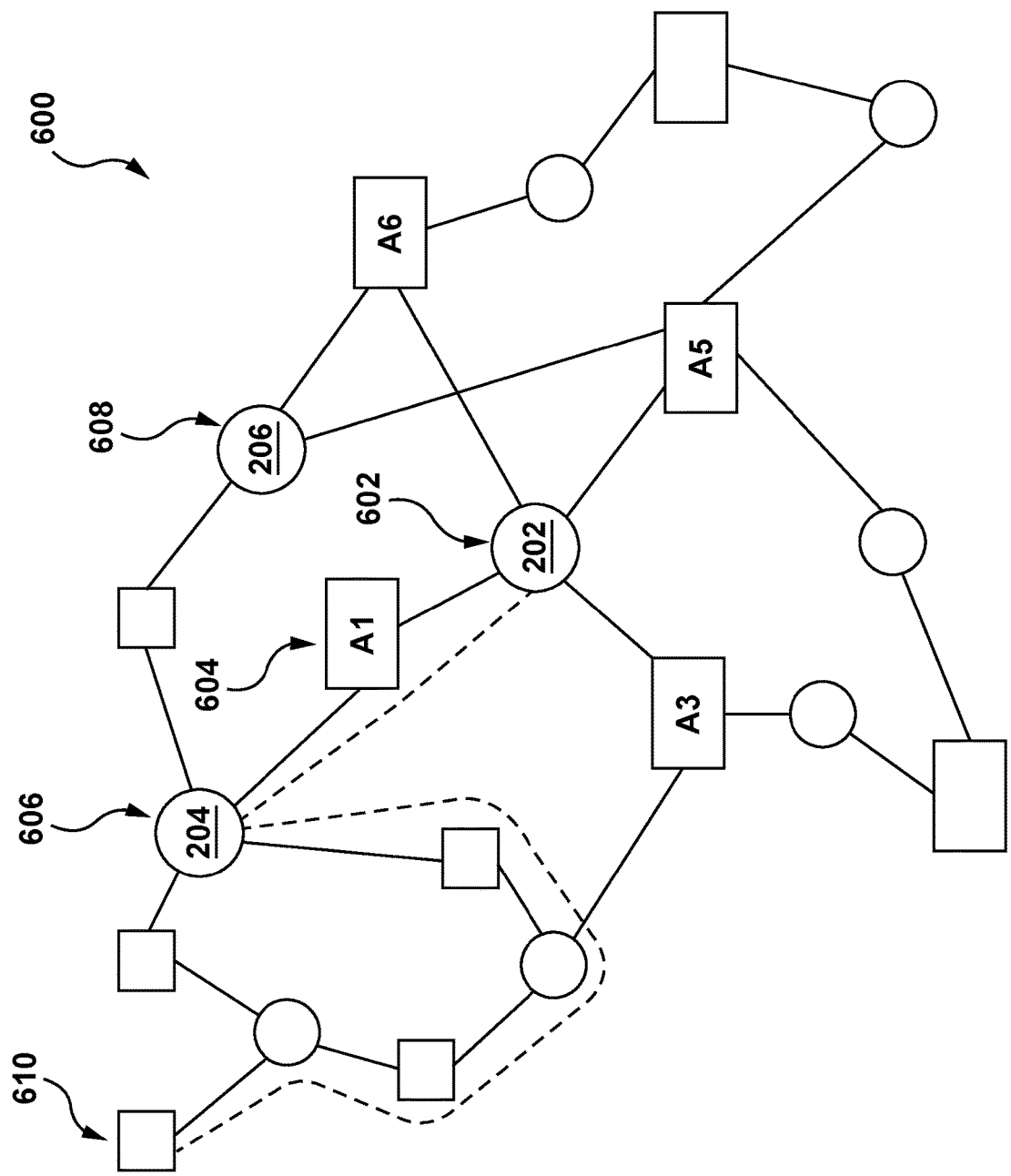
FIG. 6 depicts a graph generated in accordance with a non-limiting embodiment of the present technology.

With reference to FIG. 6, there is illustrated a web-like graph 600 that is generated by the training server 130.

In the illustrated embodiment of the graph 600, each one of the circles corresponds to a unique search query, and each one of the rectangles corresponds to a unique search result. For simplicity, all the circles and rectangles will be referred to herein as a "node".

For example, a first node 602 corresponds to the first search query 202, which is linked to four nodes (namely a second node 604), each corresponding to a search result provided within the first SERP 212. Although the first node 602 is illustrated as being linked to four nodes, this is done merely for the purpose of illustration. It is contemplated that the first node 602 is connected to more or fewer than four nodes. For example, the first node 602 may be connected to all, or only a subset (such as 10, 20, and so on) of the search results included within the first SERP 212. In another example, the first node 602 may be connected to a subset of search results within the first SERP 212 having a highest user interaction parameter.

Let us assume that the second node 604 (corresponding to the search result A1) is linked to the first node 602. The second node 604 is then linked to two other nodes each corresponding to a search query other than the first search query 202 that is associated with a SERP that includes the search result A1. Just as an example, let us assume that the search result B4 corresponds to the search result A1, then the second node 604 is connected to a third node 606 that corresponds to the second search query 204. In another example, let us assume that the search result C3 corresponds to the search result A1 (i.e. the second node 604), then a fourth node 608 corresponds to the third search query 206.

In other words, a given node within the graph 600 corresponds to a search query or a search result retrieved from the plurality of query logs 128. If the given node is a given search query, the given node is linked to node(s) that correspond to a search result that is displayed in a SERP generated in response to the given search query.

On the other hand, if the given node is a given search result, the given node is linked to node(s) that correspond to a search query that is associated with a SERP that includes the given search result.

Now, although the graph 600 has been explained as being generated based only on the portion 200 of the query logs 128, it should be understood that this is done merely for ease of explanation. It should be understood that the graph 600 is generated from the plurality of query logs 128, with the search results and search queries that have been submitted by a plurality of electronic devices.

Having generated the graph 600, the training server 130 is configured to generate the training input data 304 (see FIG. 3). In some non-limiting embodiments of the present technology, the training server 130 is configured to pair a node corresponding to a search query with a node that is a predetermined number of nodes away from said node as a negative training example. For example, the training server 130 may be configured to pair the first node 602 with one of the nodes that is an odd-number of nodes away from the first node 602.

In some non-limiting embodiments of the present technology, the odd-number of nodes is a random or predetermined number between five and nine. For example, let us assume that the odd-number of nodes correspond to 7. As such the training server 130 is configured to find a node that is 7 nodes away from the first node 602, such as the fifth node 610 which corresponds to a search result (the dotted lines showing the trajectory from the first node 602). Needless to say, the training server 130 may be configured to pair the first node 602 with each node that is 7 nodes away from the first node 602, or alternatively, pair the first node 602 with a node that is 7 nodes away that has a highest user interaction parameter.

In some non-limiting embodiments of the present technology, the training server 130 is further configured to generate a positive training example by pairing a given node (such as the first node 602) with one of its immediately linked nodes (such as the second node 604). The training input data 304 then corresponds to the negative training example and the positive training example (if any).

Figure 4:
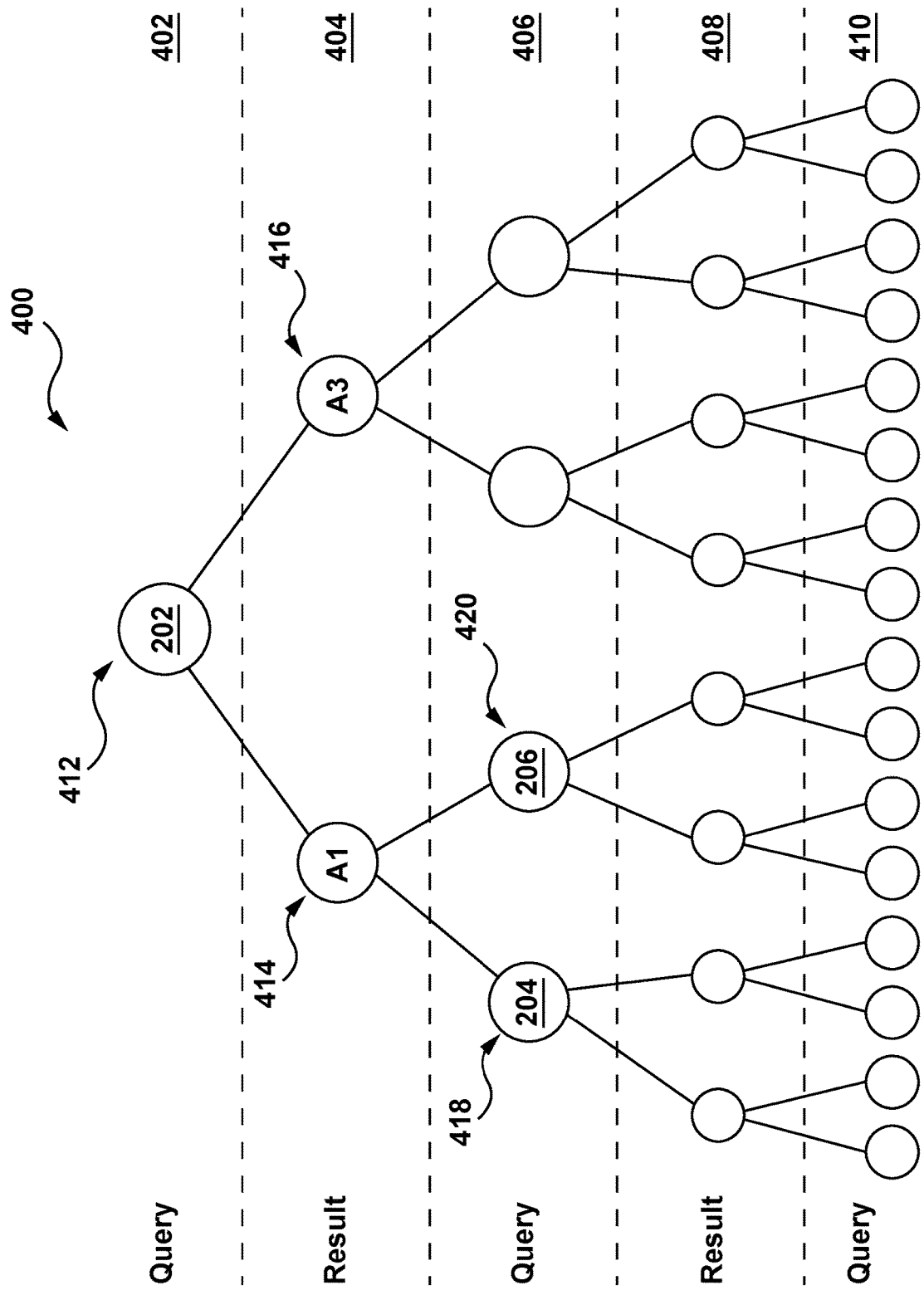
FIG. 4 depicts a data tree generated in accordance with a non-limiting embodiment of the present technology.

Although in the above example, the training server has generated the graph 600 as a web-like graph, it is not limited as such. With reference to FIG. 4, there is illustrated a data tree 400 (or graph 400) that is generated by the training server 130 after the analysis.

The data tree 400 comprises a root node 412 at a first level 402 which is linked to two child nodes at a second level 404. Each of the child nodes is then linked to two child nodes at a third level 406 and so on. Although in the illustrated example, the data tree 400 is a 5-level data tree (the first level 402, the second level 404, the third level 406, a fourth level 408 and a fifth level 410), it should be understood that this is merely done for the sake of illustration and it should be understood that the data tree 400 is a N-level data tree.

Moreover, although each node is illustrated as being connected to two respective child nodes, it is not limited as such, and it is contemplated that each node is connected to more or fewer to two child nodes, respectively.

In some non-limiting embodiments of the present technology, each of the nodes included within the odd levels of the data tree 400 corresponds to a particular search query that has been retrieved from the plurality of query logs 128, and each of the nodes included within the even levels of the data tree 400 corresponds to a particular search result retrieved from the plurality of query logs 128.

The relationship between each node will now be described. As briefly discussed above, the training server 130 is configured to analyze the plurality of query logs 128 to identify one or more search results that are common to one or more search queries. In other words, the data tree 400 illustrates how the one or more search results are linked with two or more search queries.

Let us assume for example, that the rood node 412 corresponds to the first search query 202. The root node 412 is linked to two child nodes, namely a first node 414 and a second node 416, each being a search result included within the first SERP 212 (namely A1 and A3).

Each of the first node 414 and the second node 416 is then linked to two child nodes respectively. For example, the first node 414 is linked to a third node 418 and a fourth node 420. Each of the third node 418 and fourth node 420 corresponds to a search query other than the first search query 202, that is associated with a SERP that includes the search result included in its parent node (the first node 414—search result A1). Just as an example, let us assume that the search result B4 corresponds to the search result A1 (i.e. first node 414), then the third node 418 corresponds to the second search query 204. In another example, let us assume that the search result C3 corresponds to the search result A1 (i.e. the first node 414), then the fourth node 420 corresponds to the third search query 206.

In other words, a given node within the data tree 400 corresponds to a search query or a search result retrieved from the plurality of query logs 128. If the given node is a given search query, the given node is a child node of a parent node and a parent node to two child nodes, where the parent and two child nodes correspond to a search result that is displayed in a SERP generated in response to the given search query.

On the other hand, if the given node is a given search result, the given node is a child node of a parent node and a parent node to two child nodes, where the parent and two child nodes correspond to a search query that is associated with a SERP that includes the given search result.

Now, although the data tree 400 has been explained as being generated based only on the portion 200 of the query logs 128, it should be understood that this is done merely for ease of explanation. It should be understood that the data tree 400 is generated from the plurality of query logs 128, with the search results and search queries that have been submitted by a plurality of electronic devices.

In some non-limiting embodiments of the present technology, each of the nodes included in the even levels (i.e. the "search result" nodes), correspond to the search results with a highest user interaction parameter. For example, taking the root node 412 as an example (corresponding to the first search query 202), the first node 414 and second node 416 (the two child nodes of the root node 412) correspond to the search result that has a highest interaction parameter according to the plurality of query logs 128. In other words, the training server 130 is configured to identify two search results with a highest interaction parameter that have been displayed in response to the first search query 202 within the query logs 128.

Again, it is contemplated that the each node is linked to more than two child nodes. For example, the root node 412 maybe linked to a number of child nodes each corresponding to, for example, the top 10 search results included in the first SERP 212 or all the search results included in the first SERP 212.

Having generated the data tree 400, the training server 130 is then configured to generate the training input data 304 (see FIG. 3). Generally speaking, the training input data 304 is a negative training example for training the MLA 300 in the second phase, and comprises the one of the nodes corresponding to the search query paired with one of the nodes corresponding to the search result.

In some non-limiting embodiments of the present technology, the training server 130 is configured to pair the first search query 202 (included in the root node 412) with a node that is a predetermined number of nodes away from the root node 412. More specifically, the training server 130 is configured to pair the root node 412 with one of the nodes that is an odd-number of nodes away from the root node 412, or in other words, included in the even-levels of the data tree 400.

In some non-limiting embodiments of the present technology, the odd-number of nodes is a random or predetermined number between five and nine. For example, let us assume that the odd-number of nodes correspond to 5. As such the training server 130 is configured to access a sixth level (not shown) and select, randomly, a node that corresponds to a search result. How the node within the sixth level is selected is not limited, and may for example be selected randomly. In some non-limiting embodiments of the present technology, the training server 130 is configured to select the node within the sixth level that is associated with the highest user interaction parameter.

Although in the above example, only the root node 412 is paired with a search result, it should be understood that it is possible to pair other nodes, for example, the third node 418 with a search query included within an odd-number of nodes away from the third node 418 to generate additional negative training examples.

Moreover, although in the above example, only a single data tree 400 has been generated, it should be understood that this is done merely for ease of illustration, and it should be understood that the training server 130 is configured to generate a plurality of data tree, each with a different search query as its parent node.

Finally, although in the above example, only a single negative training example has been generated, it is not limited as such. It should be understood that the training server 130 may be configured to generate more than a single negative training example, by pairing the root node 412 with one or more other search results within the sixth level. In another embodiment, the training server 130 may also be configured to generate one or more negative training example by selecting one or more search results from a different level (such as the eight level (not shown)) to be paired with the root node 412.

In some non-limiting embodiments of the present technology, the training server 130 is further configured to generate a positive training example by pairing a given node (such as the root node 412) with one of its immediately linked child nodes (such as the first node 414). The training input data 304 then corresponds to the negative training example and the positive training example (if any).

Second Embodiment

Returning to FIG. 3, a second non-limiting embodiment for generating the training input data 304 will now be described.

Similar to the first embodiment, the training server 130 is configured to receive the data packet 302 comprising the plurality of query logs 128.

The training server 130 is then configured to select, from the plurality of query logs 128, two SERPs comprising at least one common search result.

Figure 5:
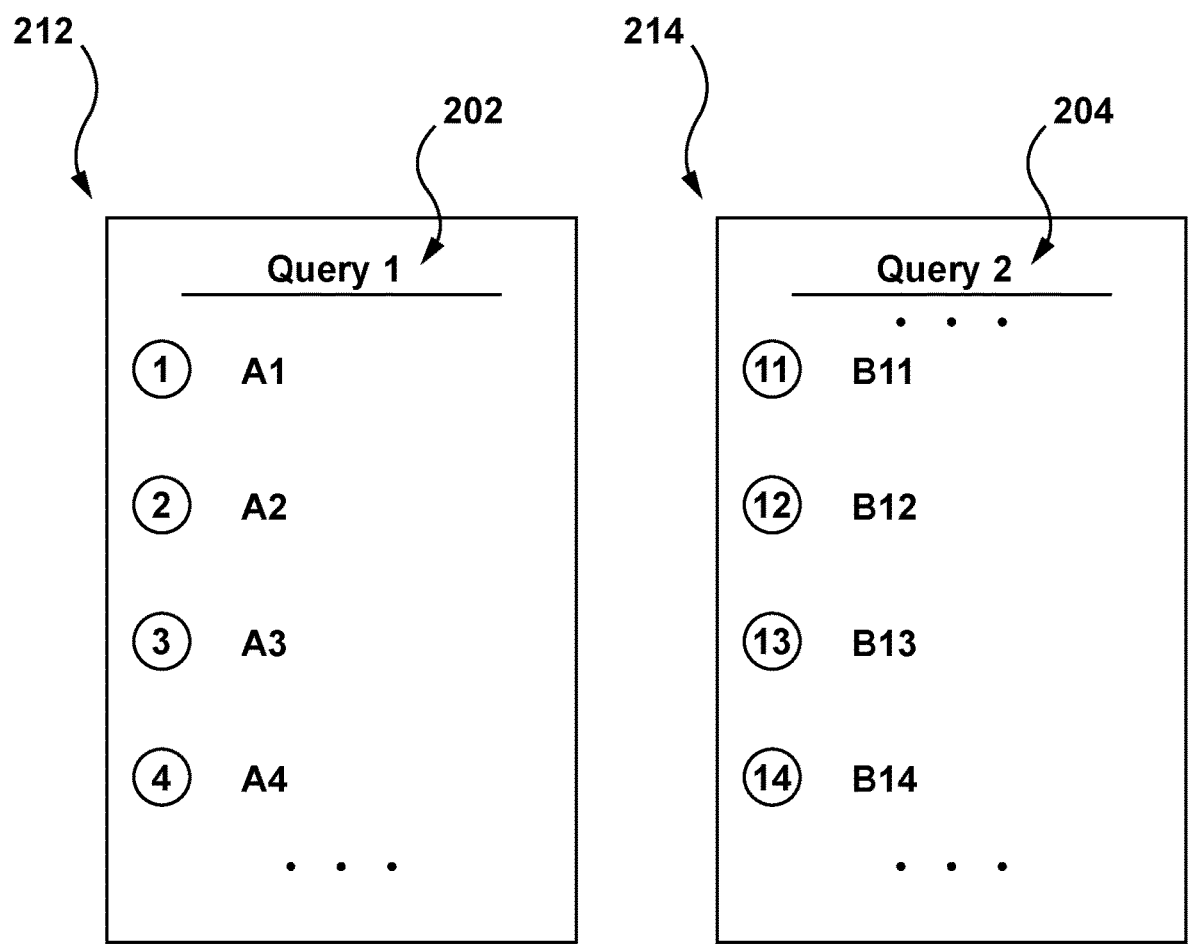
FIG. 5 depicts two search engine results page implemented in accordance with a non-limiting embodiment of the present technology.

Referring to FIG. 5, there is depicted the first SERP 212 and the second SERP 214.

Let us assume for example that the search result A4 corresponds to the search result B13. In the illustrated example, the search result A4 is positioned first within the first SERP 212 and the search result B13 is positioned at a thirteenth position within the second SERP 214.

Let us further assume that within the first SERP 212, the second search result (search result A2) has the highest user interaction parameter within the first SERP 212. In some non-limiting embodiments of the present technology, the most interacted search result corresponds to the search result that has been clicked within the first SERP 212, or an interacted search result with a longest dwelling time.

In some non-limiting embodiment of the present technology, the training server 130 is configured to determine the product of the position associated with the search result A4 and the search result B13. In other words, the training server 130 is configured to multiply the positions of the common search result of the first SERP 212 and the second SERP 214. Recalling that the search result A4 is the fourth search result within the first SERP 212, and the search result B13 is in the thirteenth position within the second SERP 214, the product corresponds to a value of 52.

In some non-limiting embodiments of the present technology, in response to the product being above a predetermined threshold (for example, but not limited to, 50), the training server 130 is configured to generate a negative training example by pairing the second search query 204 with the most interacted search result within the first SERP 212 (which corresponds to the search result A2).

For example, if the predetermined threshold corresponds to 50, the training server 130 is configured pair the second search query 204 with the search result A2 as the negative training example. On the other hand, if the predetermined threshold corresponds to 60 (i.e. above the value of 52), the training server 130 does not pair the second search query 204 with the search result A2 (i.e. does not generate the negative training example).

How the predetermined threshold is determined is not limited, and may for example be determined by an administrator of the training server 130. It should be understood from the above that when a higher value results from the product of the two position, it is indicative that the document were placed on lower ranks of the search results, thus even though the document is relevant to both queries, it is not the most relevant document for the search intent of at least one of the search queries. In other words, the non-limiting embodiments of the present technologies allow for finding two search queries (and the associated SERPs) that are related (same document) but not very close (same document being on lower-ranked positions).

In some non-limiting embodiments of the present technology, the training server 130 is further configured to generate a positive training example by pairing the first search query 202 with the most interacted search result within the first SERP 212 (i.e. the search result A2).

The training input data 304 then corresponds to the negative training example and the positive training example (if any).

Now, although the above explanation of the generating the negative training example (and positive training example) has been done with respect to two SERP (first SERP 212 and second SERP 214), it should be understood that the this is done for ease of explanation and the training input data 304 would include more negative and positive training examples generated from other SERPs.

Training MLA

Returning to FIG. 3, how the MLA 300 is trained using the training input data 304 generated in accordance with the first and second embodiment, is now explained.

The training input data 304 is inputted into the MLA 300. The MLA 300 includes a training logic to determine a set of features associated with each negative training examples. How the MLA 300 is implemented is not limited. In some non-limiting embodiments of the present technology, the MLA 300 is implemented as a neural network.

More precisely, recalling that each of the training examples are negative training examples, the MLA 300 is configured to learn, what set of features is indicative of low relevancy of the search result to the search query.

Accordingly, the MLA 300 is configured to generate an inferred function, and when executed by the server 118 as part of the search engine service 124, which is configured to assign a ranking parameter to a given search result in response to a given search query received during the in-use phase, based on the set of features associated with the given search query and the given search result.

Needless to say, although there is depicted only a single instance of the training of the MLA 300, it is done so for ease of illustration. It should be expressly understood that the training of the MLA 300 is done iteratively using a plurality of both negative and positive training examples.

Figure 7:
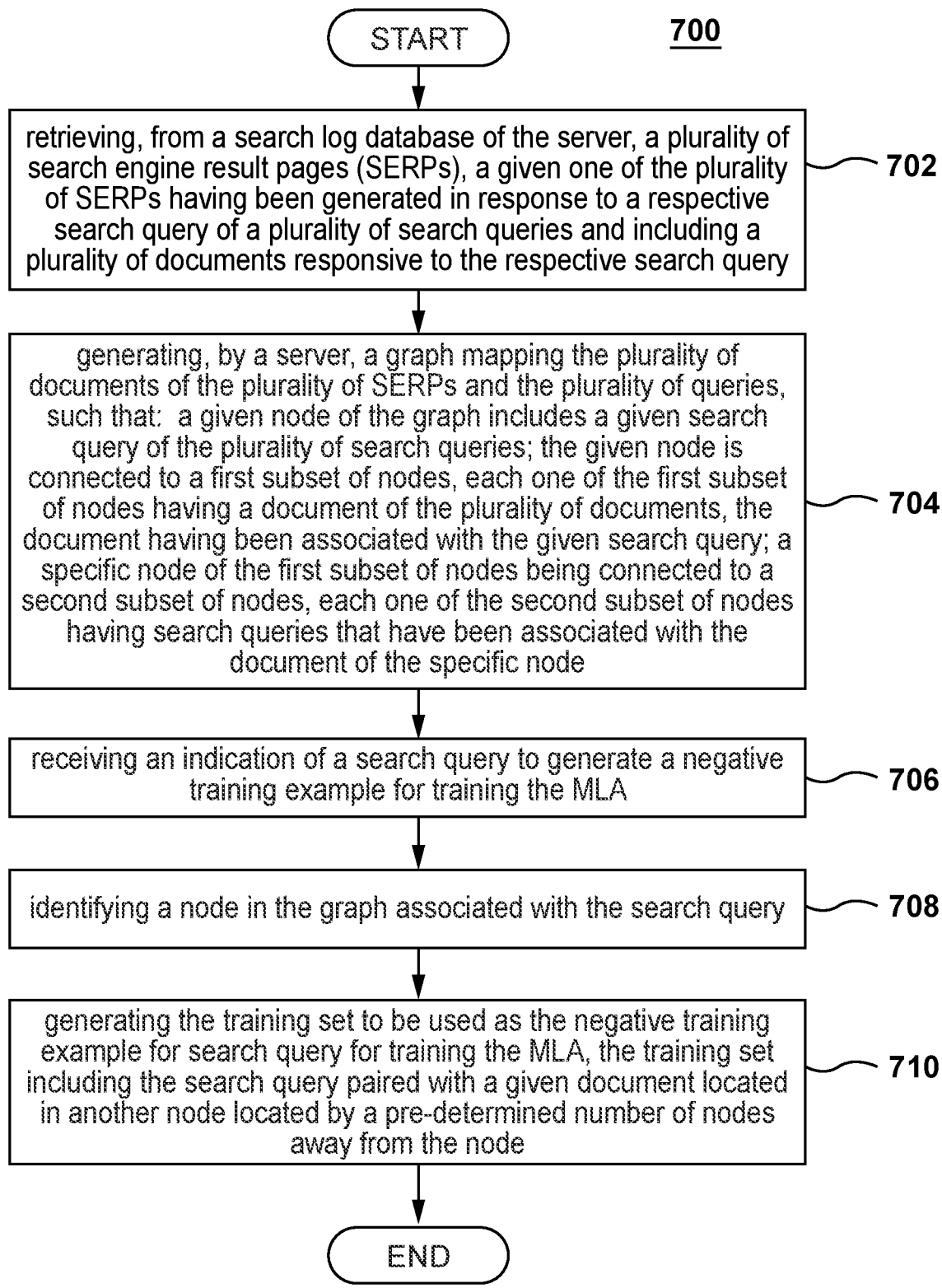
FIG. 7 is a block diagram depicting a flow chart of a first method for generating a negative training example in accordance with a non-limiting embodiment of the present technology.

Given the architecture described with reference to FIG. 4 and the examples provided hereinabove, it is possible to execute a computer-implemented method for providing a recommended content in response to determining an occurrence of a visit by a user to a venue. With reference to FIG. 7, there is depicted a flow chart of a method 700 for generating a negative training example. The method 700 being executable in accordance with non-limiting embodiments of the present technology. The method 700 can be executed by the training server 130.

Step 702: retrieving, from a search log database of the server, a plurality of search engine result pages (SERPs), a given one of the plurality of SERPs having been generated in response to a respective search query of a plurality of search queries and including a plurality of documents responsive to the respective search query Method 700 starts with step 702, where the training server 130 retrieves the data packet 302 from the log database 126. The data packet 302 comprises the plurality of query logs 128.

The purpose of the query logs 128 is to log searches that were made using the server 118. More specifically, the query logs 128 maintain terms of search queries (i.e. the associated search words) and the associated search results. For example, each of the query log included within the plurality of query logs 128 is associated with a respective electronic device (such as the electronic device 102). It is noted that the query logs 128 can be maintained in an anonymized manner—i.e. search queries are not trackable to the users who have submitted the search query.

Step 704: generating, by a server, a graph mapping the plurality of documents of the plurality of SERPs and the plurality of queries, such that: a given node of the graph includes a given search query of the plurality of search queries; the given node is connected to a first subset of nodes, each one of the first subset of nodes having a document of the plurality of documents, the document having been associated with the given search query; a specific node of the first subset of nodes being connected to a second subset of nodes, each one of the second subset of nodes having search queries that have been associated with the document of the specific node At step 704, in response to receiving the data packet 302, the training server is configured to generate the data tree 400 or the graph 600.

Taking the graph 600 as an example, each one of the circles corresponds to a unique search query, and each one of the rectangles corresponds to a unique search result. For simplicity, all the circles and rectangles will be referred to herein as a "node".

For example, a first node 602 corresponds to the first search query 202, which is linked to four nodes (namely a second node 604), each corresponding to a search result provided within the first SERP 212. Although the first node 602 is illustrated as being linked to four nodes, this is done merely for the purpose of illustration. It is contemplated that the first node 602 is connected to more or fewer than four nodes. For example, the first node 602 may be connected to all, or only a subset (such as 10, 20, and so on) of the search results included within the first SERP 212. In another example, the first node 602 may be connected to a subset of search results within the first SERP 212 having a highest user interaction parameter.

Let us assume that the second node 604 (corresponding to search result A1) is linked to the first node 602. The second node 604 is then linked to 2 other nodes each corresponding to a search query other than the first search query 202, that is associated with a SERP that includes the search result A1. Just as an example, let us assume that the search result B4 corresponds to the search result A1, then the second node 604 is connected to a third node 606 that corresponds to the second search query 204. In another example, let us assume that the search result C3 corresponds to the search result A1 (i.e. the second node 604), then a fourth node 608 corresponds to the third search query 206.

Step 706: receiving an indication of a search query to generate a negative training example for training the MLA At step 706, the training server 130 is configured to select a node within the graph 600 that corresponds to a search query. For example, the training server 130 is configured to select the root node 412.

Step 708: identifying a node in the graph associated with the search query

At step 708, the training server 130 is configured to select a node within the graph 600 that is a predetermined number of nodes away from the root node 412.

Step 710: generating the training set to be used as the negative training example for search query for training the MLA, the training set including the search query paired with a given document located in another node located by a pre-determined number of nodes away from the node At step 710, the training server 130 is configured to generate the negative training example, which corresponds to the search query of the root node 412 with the node that is a predetermined number of nodes away.

The method 700 then terminates or returns to step 702.

Figure 8:
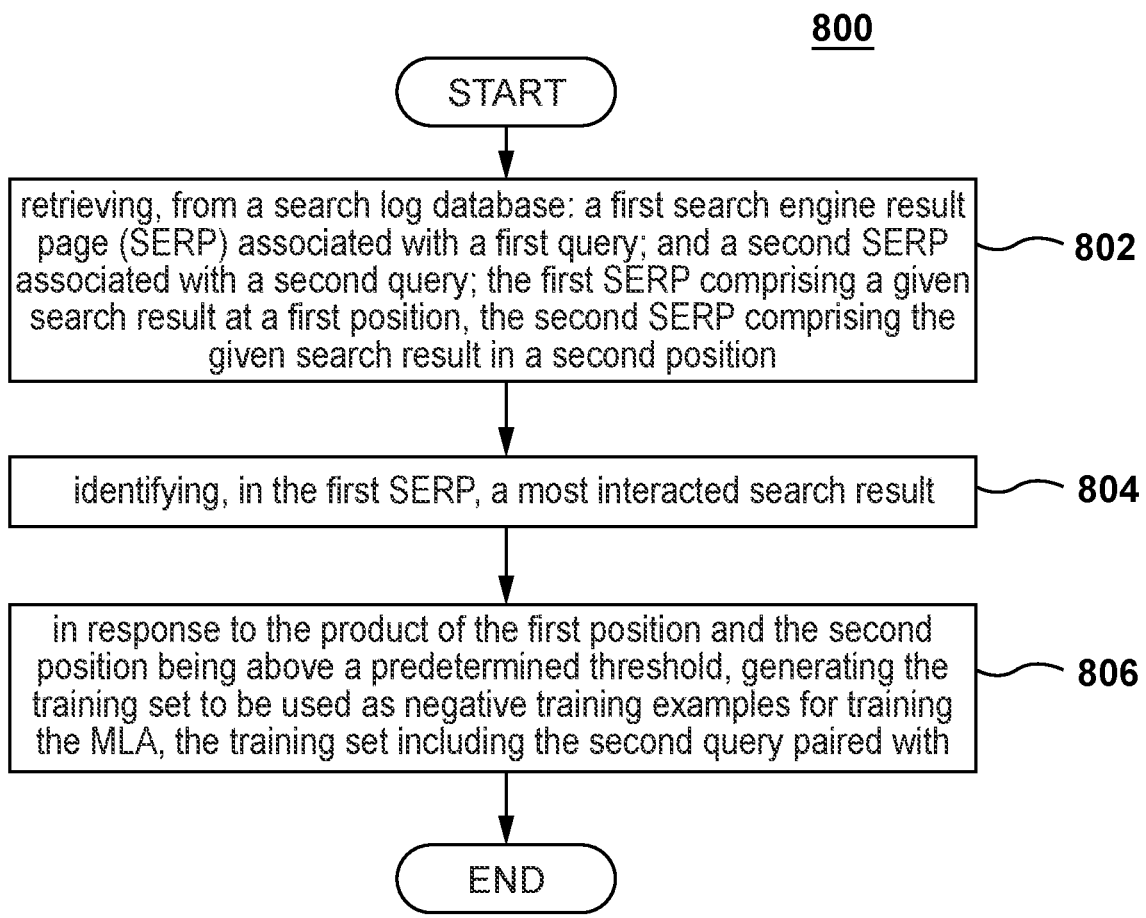
FIG. 8 is a block diagram depicting a flow chart of second method for generating a negative training example in accordance with another non-limiting embodiment of the present technology.

Given the architecture described with reference to FIG. 5 and the examples provided hereinabove, it is possible to execute a computer-implemented method for providing a recommended content in response to determining an occurrence of a visit by a user to a venue. With reference to FIG. 8, there is depicted a flow chart of a method 800 for generating a negative training example. The method 800 being executable in accordance with non-limiting embodiments of the present technology. The method 800 can be executed by the training server 130.

Step 802: retrieving, from a search log database: a first search engine result page (SERF) associated with a first query; and a second SERF associated with a second query; the first SERF comprising a given search result at a first position, the second SERF comprising the given search result in a second position Method 800 starts with step 802, where the training server 130 retrieves the plurality of logs 128 from the log database 126.

The training server 130 is then configured to select, from the plurality of query logs 128, two SERPs comprising at least one common search result, the first SERP 212 and the second SERP 214.

Let us assume for example that the search result A4 corresponds to the search result B13. In the illustrated example, the search result A4 is positioned at a fourth position within the first SERP 212 and the search result B13 is positioned at a thirteenth position within the second SERP 214.

Step 804: identifying, in the first SERP, a most interacted search result

At step 804, the training server 130 is configured to identify, within the first SERP 212, the search result with a highest user interaction parameter.

Step 806: in response to the product of the first position and the second position being above a predetermined threshold, generating the training set to be used as negative training examples for training the MLA, the training set including the second query paired with the most interacted search result At step 806, the training server 130 is configured to determine the product of the position associated with the search result A4 and the search result B13. In other words, the training server 130 is configured to multiply the positions of the common search result of the first SERP 212 and the second SERP 214. Recalling that the search result A4 is the fourth search result within the first SERP 212, and the search result B13 is in the thirteenth position within the second SERP 214, the product corresponds to a value of 52.

In some non-limiting embodiments of the present technology, in response to the product being above a predetermined threshold, the training server 130 is configured to generate a negative training example by pairing the second search query 204 with the most interacted search result within the first SERP 212 (which corresponds to the search result A2).

The method 800 then terminates or return to step 802.

It should be apparent to those skilled in the art that at least some embodiments of the present technology aim to expand a range of technical solutions for addressing a particular technical problem encountered by the conventional method of generating negative training examples.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A computer-implemented method for generating a training set for training a machine learning algorithm (MLA) implemented in an information retrieval system, the MLA executable by a server, the method executable by the server, the method comprising:
   retrieving, from a search log database of the server, a plurality of search engine result pages (SERPs), a given one of the plurality of SERPs having been generated in response to a respective search query of a plurality of search queries and including a plurality of documents responsive to the respective search query;
   generating, by a server, a graph mapping the plurality of documents of the plurality of SERPs and the plurality of queries, such that:
      a given node of the graph includes a given search query of the plurality of search queries;
      the given node is connected to a first subset of nodes, each one of the first subset of nodes having a document of the plurality of documents, the document having been associated with the given search query;
      a specific node of the first subset of nodes being connected to a second subset of nodes, each one of the second subset of nodes having search queries that have been associated with the document of the specific node;
   receiving an indication of a search query to generate a negative training example for training the MLA;
   identifying a node in the graph associated with the search query;
   generating the training set to be used as the negative training example for the search query for training the MLA, the training set including the search query paired with a given document located in another node located by a pre-determined number of nodes away from the node;
   training, using the training set and a plurality of positive training examples, the MLA, wherein the MLA is a neural network, and wherein the MLA is configured to generate an inferred function; and
   executing the inferred function to assign a ranking parameter to a search result in response to a received search query, based on a set of features associated with the received search query and the search result.

2. The method of claim 1, wherein the pre-determined number of nodes is an odd number of nodes.

3. The method of claim 2, wherein the odd number of nodes is a random number between five and nine.

4. The method of claim 2, wherein the odd number of nodes is a pre-determined number between five and nine.

5. The method of claim 1, wherein an association between the document and the given search query is by virtue of one of being included in an associated SERP and being clicked in response to the associated SERP having been presented.

6. The method of claim 1, wherein the another node is included in a third subset of nodes located by the pre-determined number of nodes away from the node, and wherein the method further comprises selecting the another node from the third subset of nodes.

7. The method of claim 6, wherein selecting the another node from the third subset of nodes comprises selecting the another node in response to the another node having a highest user interaction parameter amongst the third subset of nodes.

8. The method of claim 7, wherein the user interaction parameter for the given document is indicative of at least one of: a hovering time for the given document or a click event for the given document.

9. The method of claim 1, wherein the plurality of positive training examples comprises the search query paired with a document located in another node that is immediately linked to the node.

10. The method of claim 1, wherein the graph is a data tree.

11. The method of claim 10, wherein identifying the node in the graph associated with the search query comprises identifying a root node of the data tree.

12. The method of claim 1, wherein the graph is a web-like graph.

13. A computer-implemented method for generating a training set for training a machine learning algorithm (MLA) implemented in an information retrieval system, the MLA executable by a server, the method executable by the server, the method comprising:
   retrieving, from a search log database:
      a first search engine result page (SERP) associated with a first query; and
      a second SERP associated with a second query;
      the first SERP comprising a given search result at a first rank, the second SERP comprising the given search result in a second rank;
   identifying, in the first SERP, a most interacted search result;
   in response to the product of the first rank and the second rank being above a predetermined threshold, generating the training set to be used as negative training examples for training the MLA,
      the training set including the second query paired with the most interacted search result; and
   training, using the training set and a plurality of positive training examples, the MLA wherein the MLA is a neural network, and wherein the MLA is configured to generate an inferred function; and
   executing the inferred function to assign a ranking parameter to a search result in response to a received search query, based on a set of features associated with the received search query and the search result.

14. The method of claim 13, wherein the plurality of positive training examples comprises the first query paired with the most interacted search result.

15. The method of claim 13, wherein the most interacted search result comprises a given search result of the first SERP that was clicked.

16. The computer-implemented method of claim 14, wherein the given search result is one of a plurality of interacted search results and the wherein the most interacted search result is one of the plurality of interacted search results with a longest interaction.

17. The method of claim 13, wherein the predetermined threshold is fifty.

18. A system for generating a training set for training a machine learning algorithm (MLA) implemented in an information retrieval system, the system comprising at least one processor and memory comprising executable instructions, which, when executed by the at least one processor, cause the system to:
   retrieve, from a search log database of the server, a plurality of search engine result pages (SERPs), a given one of the plurality of SERPs having been generated in response to a respective search query of a plurality of search queries and including a plurality of documents responsive to the respective search query:
   generate, a graph mapping the plurality of documents of the plurality of SERPs and the plurality of queries, such that:
      a given node of the graph includes a given search query of the plurality of search queries;
      the given node is connected to a first subset of nodes, each one of the first subset of nodes having a document of the plurality of documents, the document having been associated with the given search query;
      a specific node of the first subset of nodes being connected to a second subset of nodes, each one of the second subset of nodes having search queries that have been associated with the document of the specific node;
   receive an indication of a search query to generate a negative training example for training the MLA;
   identify a node in the graph associated with the search query;
   generate the training set to be used as the negative training example for training the MLA, the training set including the search query paired with a given document located in another node located by a pre-determined number of nodes away from the node;
   train, using the training set and a plurality of positive training examples, the MLA, wherein the MLA is a neural network, and wherein the MLA is configured to generate an inferred function; and
   execute the inferred function to assign a ranking parameter to a search result in response to a received search query, based on a set of features associated with the received search query and the search result.

19. The system of claim 18, wherein the pre-determined number of nodes is an odd number of nodes.

20. A system for generating a training set for training a machine learning algorithm (MLA) implemented in an information retrieval system, the system comprising at least one processor and memory comprising executable instructions, which, when executed by the at least one processor, cause the system to:
   retrieve, from a search log database:
      a first search engine result page (SERP) associated with a first query; and
      a second SERP associated with a second query;
      the first SERP comprising a given search result at a first rank, the second SERP comprising the given search result in a second rank;
   identify, in the first SERP, a most interacted search result;
   in response to the product of the first rank and the second rank being above a predetermined threshold, generate the training set to be used as negative training examples for training the MLA,
      the training set including the second query paired with the most interacted search result; and
   train, using the training set and a plurality of positive training examples, the MLA, wherein the MLA is a neural network, and wherein the MLA is configured to generate an inferred function; and
   execute the inferred function to assign a ranking parameter to a search result in response to a received search query, based on a set of features associated with the received search query and the search result.

* * * * *